(12) United States Patent
Kasamatsu et al.

(10) Patent No.: US 10,921,034 B2
(45) Date of Patent: Feb. 16, 2021

(54) REFRIGERATION CYCLE DEVICE

(71) Applicant: DENSO CORPORATION, Kariya (JP)

(72) Inventors: Shinya Kasamatsu, Kariya (JP); Satoshi Ito, Kariya (JP); Hideaki Sato, Kariya (JP); Takuya Fuse, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 16/082,297

(22) PCT Filed: Oct. 21, 2016

(86) PCT No.: PCT/JP2016/081206
§ 371 (c)(1),
(2) Date: Sep. 5, 2018

(87) PCT Pub. No.: WO2017/187655
PCT Pub. Date: Nov. 2, 2017

(65) Prior Publication Data
US 2019/0032979 A1   Jan. 31, 2019

(30) Foreign Application Priority Data

Apr. 28, 2016 (JP) ................................. 2016-090708

(51) Int. Cl.
*F25B 47/02* (2006.01)
*F28D 20/02* (2006.01)
(Continued)

(52) U.S. Cl.
CPC ....... *F25B 47/022* (2013.01); *B60H 1/00492* (2013.01); *B60H 1/00921* (2013.01);
(Continued)

(58) Field of Classification Search
CPC ...... F25B 47/022; F25B 47/02; F25B 47/025; F28F 3/10; F28D 20/00
See application file for complete search history.

(56) References Cited

U.S. PATENT DOCUMENTS 4,270,523 A * 6/1981 van Heel .............. F28D 20/021
                                                    126/619
4,646,539 A * 3/1987 Taylor ................... F25B 47/022
                                                    62/196.4
(Continued)

FOREIGN PATENT DOCUMENTS

JP   2007-218537 A   8/2007
JP   2009-287903 A   12/2009
(Continued)

*Primary Examiner* — David J Teitelbaum
(74) *Attorney, Agent, or Firm* — Posz Law Group, PLC (57) ABSTRACT

During a normal operation, a refrigeration cycle device is switched to a refrigerant circuit in which heat contained in a high-pressure refrigerant flowing out of an interior radiator is stored in a heat storage member. When frost is formed on an evaporator, the refrigeration cycle device is switched to another refrigerant circuit in which the exterior heat exchanger is heated and defrosted using heat stored in the heat storage member as a heat source. The heat storage member uses a material formed by adding W (tungsten) as an additive to $VO_2$ (vanadium dioxide) which is a transition metal oxide having a property of a phase transition between a metal and an insulator. The heat storage member effectively stores or dissipates heat depending on a temperature zone of the refrigerant, thereby suppressing an increase in energy consumption of a compressor.

6 Claims, 7 Drawing Sheets

(51) Int. Cl.
*F28D 20/00* (2006.01)
*B60H 1/00* (2006.01)
*F28F 3/10* (2006.01)

(52) U.S. Cl.
CPC ............ F25B 47/02 (2013.01); F28D 20/003 (2013.01); F28D 20/0056 (2013.01); F28D 20/02 (2013.01); F28F 3/10 (2013.01); *F25B 47/025* (2013.01); *F25B 2313/0211* (2013.01); *F25B 2339/04* (2013.01); *F25B 2500/09* (2013.01); *F28D 20/00* (2013.01)

(56) References Cited

U.S. PATENT DOCUMENTS

| | | | |
|---|---|---|---|
| 5,269,151 A * | 12/1993 | Dinh | F25B 47/022 |
| | | | 62/278 |
| 2010/0309539 A1 * | 12/2010 | Kaye | G02F 1/174 |
| | | | 359/288 |
| 2011/0205542 A1 | 8/2011 | Jones et al. | |
| 2016/0075926 A1 * | 3/2016 | Niitaka | C09K 5/02 |
| | | | 165/10 |
| 2017/0036507 A1 | 2/2017 | Fuse et al. | |
| 2017/0043553 A1 * | 2/2017 | Tanaka | H01L 23/3735 |

FOREIGN PATENT DOCUMENTS

| | | |
|---|---|---|
| JP | 2010-163510 A | 7/2010 |
| JP | 2015-071795 A | 4/2015 |
| JP | 2015-124922 A | 7/2015 |

* cited by examiner

FIG. 1

⇨ NORMAL OPERATION (AIR-HEATING OPERATION)
➡ DEFROSTING OPERATION

NORMAL OPERATION

FIG. 4

DEFROSTING OPERATION

NORMAL OPERATION

FIG. 8

DEFROSTING OPERATION

REFRIGERATION CYCLE DEVICE

CROSS REFERENCE TO RELATED APPLICATIONS

This application is a U.S. national phase of International Application No. PCT/JP2016/081206 filed on Oct. 21, 2016 and is based on Japanese Patent Application No. 2016-090708 filed on Apr. 28, 2016, the contents of which are incorporated herein by reference in its entirety.

FIELD OF THE INVENTION

The present disclosure relates to a refrigeration cycle device, which performs a defrosting operation for defrosting an evaporator when frost is formed on the evaporator.

BACKGROUND

Conventionally, for example, Patent Document 1 discloses a refrigeration cycle device, which performs a defrosting operation for defrosting an evaporator that evaporates a refrigerant, when frost is formed on the evaporator. In the refrigeration cycle device described in Patent Document 1, when the evaporator has frost formed thereon, a high-temperature refrigerant (i.e., hot gas) discharged from a compressor is caused to flow into the evaporator, thereby executing the defrosting of the evaporator.

RELATED ART DOCUMENT

Patent Document

[Patent Document 1] Japanese Unexamined Patent Application Publication No. 2007-218537

SUMMARY

However, according to studies conducted by the inventors of the present disclosure, it has been found that in order to defrost the evaporator with hot gas in the same manner as the refrigeration cycle device of Patent Document 1, the compressor must be operated to enable discharge of the hot gas even during the defrosting operation. Consequently, the execution of the defrosting operation causes an increase in energy consumption of the compressor.

Furthermore, the refrigeration cycle device is designed to heat a fluid to be heated (for example, ventilation air to be blown into a space to be air-conditioned) by exchanging heat between the fluid to be heated and a high-temperature refrigerant discharged from the compressor, using a radiator. In such a refrigeration cycle device, its heating capability for the fluid to be heated would be reduced during the defrosting operation.

In view of the foregoing matter, it is an object of the present disclosure to suppress an increase in energy consumption of a compressor in a refrigeration cycle device capable of performing a defrosting operation.

A refrigeration cycle device according to an aspect of the present disclosure includes a compressor that compresses and discharges a refrigerant, a radiator that dissipates heat from the refrigerant, a decompression device that decompresses the refrigerant, and an evaporator that evaporates the refrigerant. In the refrigeration cycle device, during a normal operation, a high-pressure refrigerant discharged from the compressor dissipates heat in the radiator, the refrigerant flowing out of the radiator is decompressed by the decompression device, a low-pressure refrigerant decompressed by the decompression device evaporates in the evaporator, and the refrigerant flowing out of the evaporator is drawn into the compressor. The refrigeration cycle device further includes a solid heat storage member configured to store heat contained in the high-pressure refrigerant that circulates through a refrigerant flow passage leading from a discharge side of the compressor to an inlet side of the decompression device during the normal operation. In addition, the heat storage member contains a strongly correlated electron-based material that stores or dissipates heat by undergoing a phase transition between a metal and an insulator, and the evaporator is heated using the heat stored in the heat storage member as a heat source during a defrosting operation for removing frost formed on the evaporator.

Thus, during the defrosting operation, the evaporator is heated using the heat stored in the heat storage member as a heat source. Consequently, the evaporator can be defrosted while suppressing an increase in energy consumption of the compressor.

In addition, a solid member containing a strongly correlated electron-based material is used as the heat storage member, so that the heat storage member can store and dissipate heat required for the defrosting while being in the solid state. Thus, the heat storage member can be very easily installed in the refrigeration cycle device, compared to the case of using heat storage agents to store or dissipate heat through a phase change between a liquid and a solid or a phase change between gas and a solid.

The mixture material formed by adding an additive to the transition metal oxide is used as the strongly correlated electron-based material, thus making it possible to adjust the transition temperature (phase transition temperature between a metal and an insulator). Thus, the transition temperature of the strongly correlated electron-based material can be appropriately adjusted in advance depending on the used temperature zone of the refrigerant in the refrigeration cycle device. Therefore, the heat storage member can achieve the effective heat storage or heat dissipation.

DETAILED DESCRIPTION

First Embodiment

Figure 1:
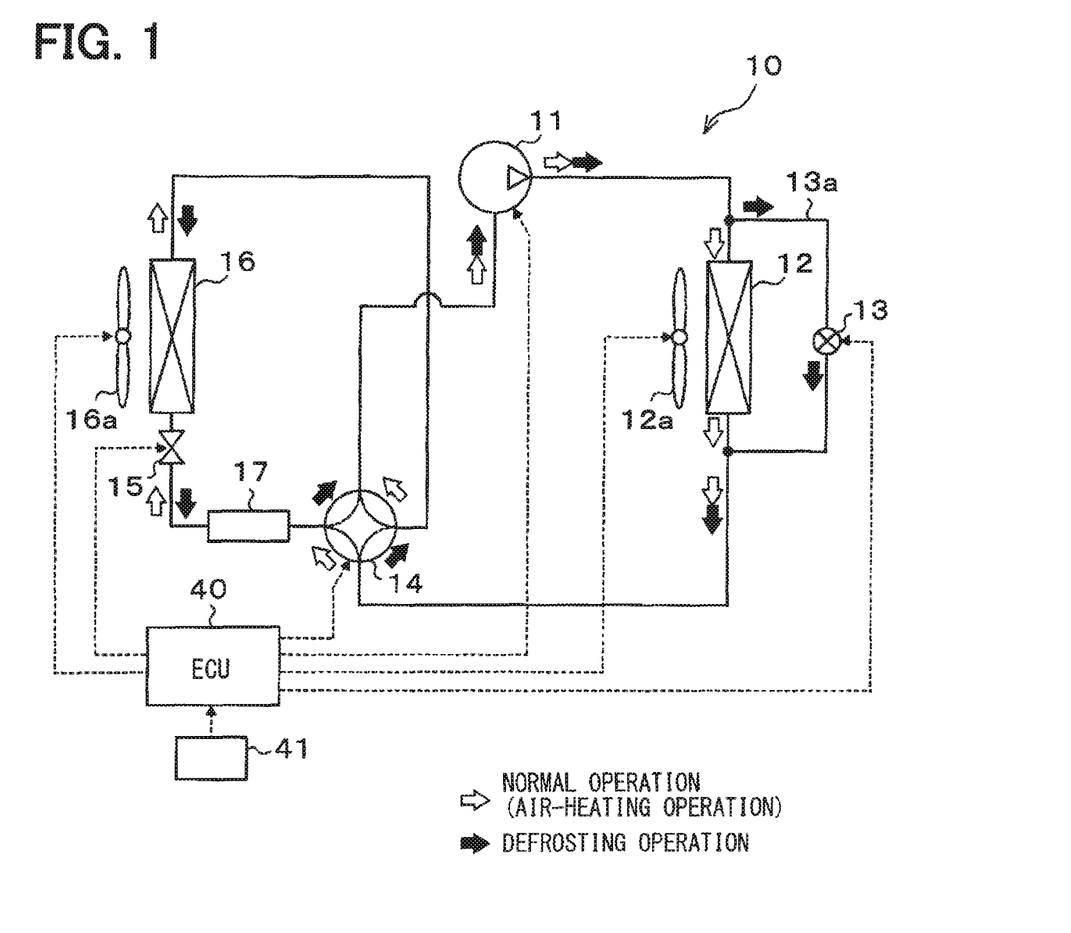
FIG. 1 is an entire configuration diagram of a refrigeration cycle device according to a first embodiment.

A first embodiment of the present disclosure will be described below with reference to FIGS. 1 to 4. In the present embodiment, a refrigeration cycle device 10 shown in the entire configuration diagram of FIG. 1 is used in a heating apparatus. The refrigeration cycle device 10 serves to heat ventilation air to be blown into an interior space as a space to be air-conditioned in the heating apparatus. Thus, the fluid to be heated in the refrigeration cycle device 10 is the ventilation air.

The refrigeration cycle device 10 can switch between a normal operation (air-heating operation) for heating the ventilation air and a defrosting operation for defrosting an exterior heat exchanger 16, serving as an evaporator, when frost is formed on the exterior heat exchanger 16, through the switchover of a refrigerant circuit. Referring to FIG. 1, the refrigerant flow in the normal operation is indicated by the outlined arrows, while the refrigerant flow in the defrosting operation is indicated by filled arrows.

The refrigeration cycle device 10 includes a compressor 11, an interior radiator 12, a four-way valve 14, an expansion valve 15, the exterior heat exchanger 16, and the like.

The compressor 11 draws, compresses, and discharges the refrigerant in the refrigeration cycle device 10. The compressor 11 is an electric compressor configured to accommodate a fixed displacement compression mechanism and an electric motor for driving the compression mechanism in a housing. The electric motor has its operation (rotational speed) controlled by a control signal output from a controller 40 to be described later.

A discharge port of the compressor 11 is connected to an inlet side of the interior radiator 12. The interior radiator 12 is a radiator that exchanges heat between the refrigerant discharged from the compressor 11 and ventilation air blown from a blower 12a, thereby heating the ventilation air during the normal operation. The blower 12a is an electric blower that has its rotational speed (air blowing volume) controlled by a control voltage output from the controller 40.

The refrigeration cycle device 10 is provided with a bypass passage 13a that guides a refrigerant discharged from the compressor 11 to a refrigerant outlet side of the interior radiator 12 while causing the refrigerant to bypass the interior radiator 12. In the bypass passage 13a, an on-off valve 13 is disposed to open and close the bypass passage 13a.

The on-off valve 13 is a solenoid valve that has its operation controlled by a control signal output from the controller 40. The on-off valve 13 configures a refrigerant circuit switching device that switches the refrigerant circuit in the refrigeration cycle device 10. More specifically, the on-off valve 13 closes the bypass passage 13a during the normal operation and opens the bypass passage 13a during the defrosting operation.

Here, a pressure loss caused when the refrigerant passes through the bypass passage 13a is extremely small, compared to a pressure loss caused when the refrigerant passes through the interior radiator 12. Thus, when the on-off valve 13 opens the bypass passage 13a, almost the whole amount of the refrigerant discharged from the compressor 11 flows through the bypass passage 13a to be guided to the refrigerant outlet side of the interior radiator 12.

The refrigerant outlet of the interior radiator 12 is connected to one refrigerant inlet side of the four-way valve 14. The four-way valve 14 is an electric four-way valve that has its operation controlled by a control voltage output from the controller 40. The four-way valve 14 configures a refrigerant circuit switching device that switches the refrigerant circuit together with the on-off valve 13.

More specifically, during the normal operation, the four-way valve 14 switches to a refrigerant circuit that connects the refrigerant outlet side of the interior radiator 12 and the side of one of inflow/outflow ports of the expansion valve 15 (i.e., a refrigerant inlet during the normal operation), while simultaneously connecting the side of one of refrigerant inflow/outflow ports of the exterior heat exchanger 16 (i.e., a refrigerant outlet during the normal operation) and the suction port side of the compressor 11. During the defrosting operation, the four-way valve 14 switches to a refrigerant circuit that connects the refrigerant outlet side of the interior radiator 12 and the side of one of the refrigerant inflow/outflow ports of the exterior heat exchanger 16, while simultaneously connecting the side of one of the inflow/outflow ports of the expansion valve 15 and the suction port side of the compressor 11.

The expansion valve 15 is a decompression device configured by a variable throttle mechanism that includes a valve body capable of changing its throttle opening degree and an electric actuator composed of a stepping motor for changing the throttle opening degree by displacing the valve body. The expansion valve 15 has its operation controlled by a control signal (control pulse) output from the controller 40.

The other inflow/outflow port of the expansion valve 15 (i.e., a refrigerant outlet during the normal operation) is connected to the side of the other refrigerant inflow/outflow port of the exterior heat exchanger 16. The exterior heat exchanger 16 is an evaporator that evaporates the refrigerant flowing therein by exchanging heat with an exterior air (outside air) brown from a blower fan 16a during the normal operation. The blower fan 16a is an electric blower that has its rotational speed (air blowing volume) controlled by a control voltage output from the controller 40.

In the refrigeration cycle device 10 of the present embodiment, a heat storage member 17 is disposed in a refrigerant circuit that connects the four-way valve 14 to the expansion valve 15.

In the present embodiment, the heat storage member 17 uses a strongly correlated electron-based material. Here, the strongly correlated electron-based material refers to a substance having a strong effective Coulomb interaction acting between electrons among substances.

Examples of the strongly correlated electron-based material include transition metal oxides, organic i-electron-based complexes, and the like. In the present embodiment, in order to utilize the property of metal-insulator transition, which is one of the properties possessed by the strongly correlated electron-based material, the strongly correlated electron-based material uses $VO_2$ (vanadium dioxide), which is a transition metal oxide, or $VO_2$ with an additive added thereto. The transition metal oxide has a property of changing from an insulator to metal when supplied with thermal energy from the outside.

More specifically, the transition metal oxide has the strong effective Coulomb interaction between outermost electrons of a transition metal atom. Through this, when the temperature of the transition metal oxide is lower than its metal-insulator transition temperature, the outermost electrons are brought into a state of being unable to move freely (which corresponds to an insulator). When supplied with thermal energy from the outside until the metal-insulator transition temperature is reached or exceeded, the transition metal oxide transits from the insulator state to a state where the outermost electrons can move freely (which corresponds to metal).

During such a phase transition from the insulator to the metal, the thermal energy is stored in the transition metal oxide. That is, the transition metal oxide stores heat. The heat stored at this time corresponds to, for example, the latent heat of fusion stored when an ice (solid) phase in which water molecules cannot move freely to each other is changed to a water (liquid) phase in which water molecules can move freely to each other. On the other hand, when the transition metal oxide undergoes a phase transition from the metal to the insulator, the stored heat is released.

That is, the heat stored at this time corresponds to, for example, the latent heat of fusion stored when an ice (solid) phase in which water molecules cannot move freely to each other is changed to a water (liquid) phase in which water molecules can move freely to each other. On the other hand, when the transition metal oxide undergoes a phase transition from the metal to the insulator, the stored heat is released. Therefore, the transition metal oxide can store or release heat by the phase change between the metal and insulator.

Figure 2:
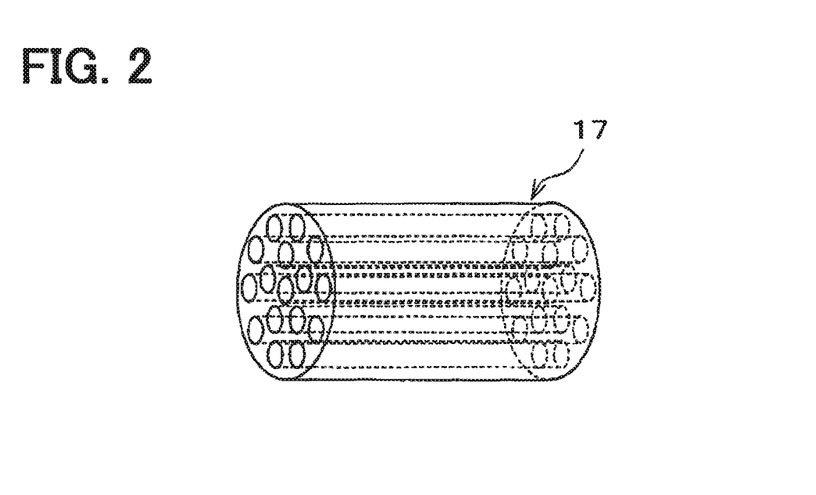
FIG. 2 is a perspective view of an outer appearance of a heat storage member in the first embodiment.

In addition, such a phase change takes place while the transition metal oxide remains solid. In the present embodiment, as shown in FIG. 2, the heat storage member 17 is provided in the form of a cylindrical member made of the transition metal oxide with a plurality of through holes extending in an axial direction. The heat storage member 17 is disposed in a refrigerant pipe, connecting the four-way valve 14 and the expansion valve 15, without being accommodated in a dedicated container or the like, to enable heat transfer through direct contact with the refrigerant. Thus, the heat storage member 17 is disposed in a refrigerant flow passage through which the refrigerant circulates in a range from the discharge port side of the compressor 11 to the inlet side of the expansion valve 15 during the normal operation.

The transition metal oxide can have its transition temperature adjusted (a phase transition temperature between the metal and insulator) by adding an additive. For example, the transition temperature of $VO_2$ is 68° C. The present embodiment uses the transition metal oxide whose transition temperature is adjusted within a range of approximately 20 to 40° C. by adding W (tungsten) to $VO_2$.

Next, an electric control unit in the present embodiment will be described. The controller 40 includes a well-known microcomputer including a CPU, a ROM, a RAM, and the like, and a peripheral circuit thereof. The controller 40 performs various calculations and processing based on control programs stored in the ROM. The controller 40 controls the operations of various electric actuators (11, 12a, 13, 14, 15, 16a) connected to the output side thereof.

The input side of the controller 40 is connected to an air-conditioning control sensor group, including an inside-air temperature sensor, an outside-air temperature sensor, an exterior unit temperature sensor, and the like. Detection values from the sensors in the sensor group are input to the input side of the controller 40. The inside-air temperature sensor is an inside-air temperature detector that detects the temperature of the interior space, which is a space to be air-conditioned. The outside-air temperature sensor is an outside-air temperature detector that detects the temperature of the outside air. The exterior unit temperature sensor is an evaporator temperature detector that detects the temperature of the exterior heat exchanger 16 (refrigerant evaporation temperature in the exterior heat exchanger 16).

The input side of the controller 40 is connected to an operation panel 41. Operation signals from various operation switches provided on the operation panel 41 are input to the controller 40. Specifically, various operation switches include an operation switch for requesting the air-conditioning (air-heating in the present embodiment), a temperature setting switch for setting the temperature of the interior space, and the like.

The controller 40 of the present embodiment incorporates therein integrated control units for controlling the operations of various control target devices connected to its output side. In the controller 40, a structure (hardware and software) configured to control the operation of each control target device serves as the control unit for controlling each control target device.

Next, the operation of the refrigeration cycle device 10 with the above-mentioned configuration in the present embodiment will be described. The refrigeration cycle device 10 of the present embodiment can be switched between the normal operation and the defrosting operation. First, the normal operation of the refrigeration cycle device will be described. The normal operation is executed when a frost formation determination portion of the controller 40 determines that frost is not formed on the exterior heat exchanger 16 after the operation switch of the operation panel 41 is turned on (ON).

Here, a control program and the like can be employed as the frost formation determination portion, which determines that the frost is formed on the exterior heat exchanger 16 when a detection value Te of the exterior unit temperature sensor is lower than a value obtained by subtracting a predetermined reference temperature α from a detection value Tam of the outside-air temperature sensor (i.e., when Te<Tam−α).

During the normal operation, the controller 40 closes the on-off valve 13 and controls an operation of the four-way valve 14 to connect the refrigerant outlet side of the interior radiator 12 and the side of one inflow/outflow port of the expansion valve 15 and simultaneously to connect the side of one refrigerant inflow/outflow port of the exterior heat exchanger 16 and the suction port side of the compressor 11.

The controller 40 also controls the operations of the compressor 11, the blower 12a, the expansion valve 15, and the blower fan 16a such that a detection value of the inside-air temperature sensor approaches the preset temperature set by a temperature setting switch in accordance with the detection signals from the air-conditioning control sensor group.

Thus, during the normal operation, the refrigeration cycle device is switched to the refrigerant circuit through which the refrigerant flows as indicated by the outlined arrows shown in FIG. 1. That is, in the refrigerant circuit, to which the refrigeration cycle device is switched, the refrigerant circulates from the compressor 11 to the interior radiator 12, (the four-way valve 14), the heat storage member 17, the expansion valve 15, the exterior heat exchanger 16, (the four-way valve 14), and eventually the compressor 11 in this order. Thus, in the normal operation, the state of the refrigerant changes as illustrated in a Mollie diagram of FIG. 3.

More specifically, a high-temperature and high-pressure refrigerant discharged from the compressor 11 (at point a3 in FIG. 3) flows into the interior radiator 12 because the on-off valve 13 is closed. The refrigerant flowing into the interior radiator 12 exchanges heat with the ventilation air blown from the blower 12a to dissipate heat in the interior radiator 12 (from point a3 to point b3 in FIG. 3). In this way, the ventilation air is heated.

Figure 3:
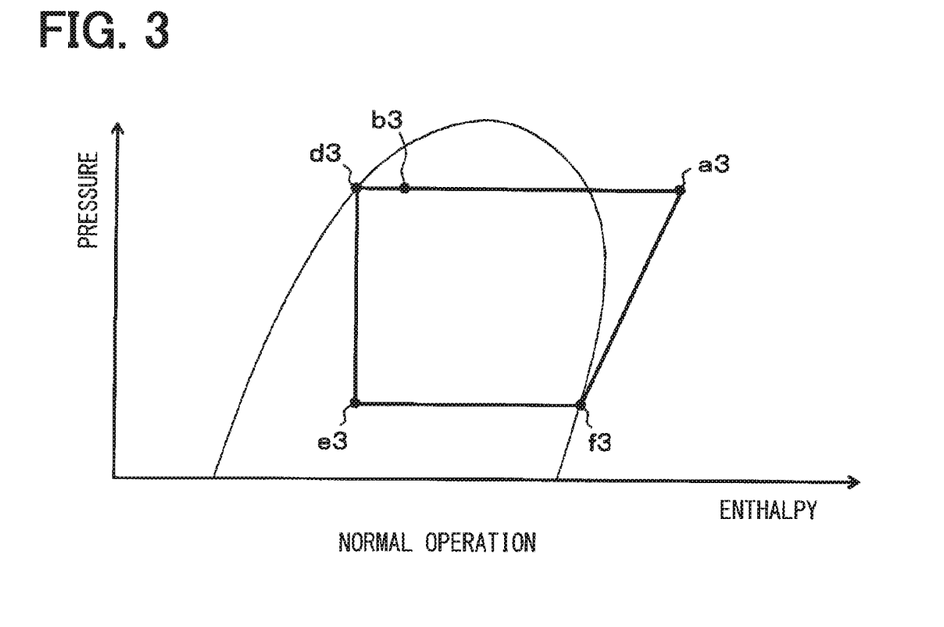
FIG. 3 is a Mollie diagram showing the state of a refrigerant in a normal operation of the refrigeration cycle device in the first embodiment.

The high-pressure refrigerant flowing out of the interior radiator 12 dissipates heat in the heat storage member 17 until the temperature of the heat storage member 17 becomes substantially equal to the temperature of the high-pressure refrigerant when the refrigerant circulates through a refrigerant pipe leading from the four-way valve 14 to the expansion valve 15 (from point b3 to point d3 in FIG. 3). At this time, the heat storage member 17 stores therein heat dissipated from the high-pressure refrigerant through the phase transition of the transition metal oxide from the insulator to the metal.

The refrigerant flowing into the expansion valve 15 is decompressed to a low-pressure refrigerant (from point d3 to point e3 in FIG. 3). The low-pressure refrigerant decompressed by the expansion valve 15 flows into the exterior heat exchanger 16. The refrigerant flowing into the exterior heat exchanger 16 absorbs heat from the outside air blown from the blower fan 16a to evaporate (from point e3 to point f3 in FIG. 3).

The low-pressure refrigerant flowing out of the exterior heat exchanger 16 is drawn into and compressed again by the compressor 11 via the four-way valve 14 (from point f3 to point a3 in FIG. 3). As mentioned above, during the normal operation, the refrigeration cycle device 10 can perform air-heating of the interior space by heating ventilation air in the interior radiator 12 and then blowing the heated ventilation air into the interior space. In addition, the heat storage member 17 can store heat therein.

Next, the defrosting operation of the refrigeration cycle device will be described. When the frost formation determination portion of the controller 40 determines that frost is formed on the exterior heat exchanger 16 during the execution of the normal operation, the defrosting operation is started and executed until a predetermined defrosting time elapses.

During the defrosting operation, the controller 40 opens the on-off valve 13 and controls an operation of the four-way valve 14 to connect the refrigerant outlet side of the interior radiator 12 and the side of one refrigerant inflow/outflow port of the exterior heat exchanger 16 and simultaneously to connect the side of one inflow/outflow port of the expansion valve 15 and the suction port side of the compressor 11. The controller 40 reduces a refrigerant discharging capability of the compressor 11, compared to that during the normal operation, stops the operation of the blower 12a, and increases a throttle opening degree of the expansion valve 15, compared to that during the normal operation.

Thus, during the defrosting operation, the refrigeration cycle device is switched to the refrigerant circuit through which the refrigerant flows as indicated by the filled arrows shown in FIG. 1. That is, in the refrigerant circuit, to which the refrigeration cycle device is switched, the refrigerant circulates from the compressor 11 to (the bypass passage 13a, the four-way valve 14), the exterior heat exchanger 16, the expansion valve 15, the heat storage member 17 (the four-way valve 14), and eventually the compressor 11 in this order. Thus, in the defrosting operation, the state of the refrigerant changes as illustrated in a Mollie diagram of FIG. 4.

Figure 4:
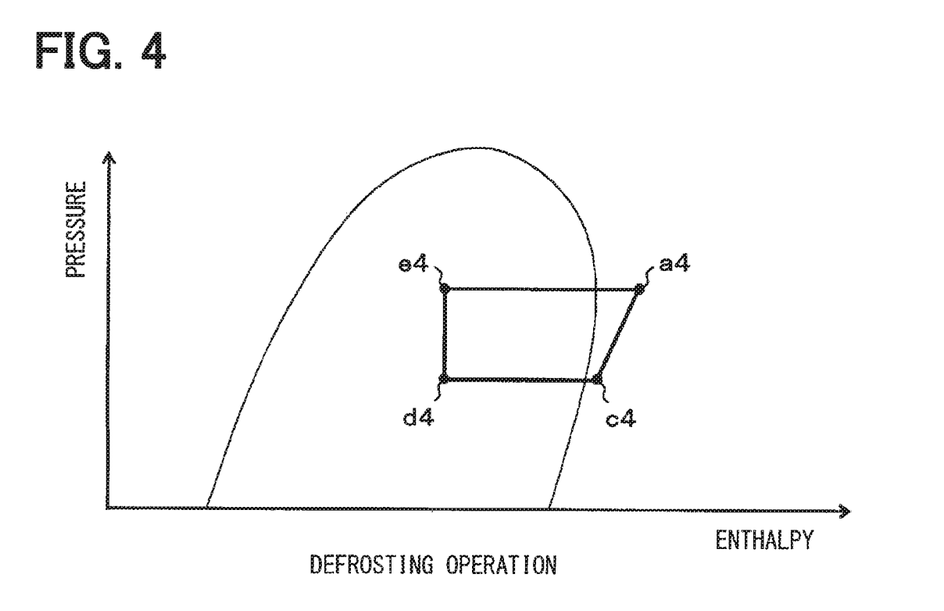
FIG. 4 is a Mollie diagram showing the state of the refrigerant in a defrosting operation of the refrigeration cycle device in the first embodiment.

In the Mollie diagram of FIG. 4, the state of the refrigerant at a position of a cycle configuration that is equivalent to that in the Mollie diagram of FIG. 3, which shows the normal operation, is denoted by the same reference character (alphabet) as in FIG. 3, with a different subscript (number) only added to the same alphabet. The same goes for the Mollie diagrams to be described in the following embodiments.

More specifically, the refrigerant discharged from the compressor 11 (at point a4 in FIG. 4) flows into the exterior heat exchanger 16 via the bypass passage 13a and the four-way valve 14 because the on-off valve 13 is opened. The refrigerant flowing into the exterior heat exchanger 16 dissipates heat in the exterior heat exchanger 16 to melt the frost (from point a4 to point e4 in FIG. 4). In this way, the exterior heat exchanger 16 is defrosted. The refrigerant flowing out of the exterior heat exchanger 16 is decompressed by the expansion valve 15 (from point e4 to point d4 in FIG. 4).

The refrigerant decompressed by the expansion valve 15 absorbs heat stored in the heat storage member 17 until the temperature of the heat storage member 17 becomes equal to the temperature of the refrigerant decompressed by the expansion valve 15 when the refrigerant circulates through a refrigerant pipe leading from the expansion valve 15 to the four-way valve 14 (from point d4 to point c4 in FIG. 4). At this time, the heat storage member 17 dissipates the stored heat through the phase transition of the transition metal oxide from the metal to the insulator.

The refrigerant having absorbed heat from the heat storage member 17 is drawn into and pressurized again by the compressor 11 via the four-way valve 14 (from point c4 to point a4 in FIG. 4). As mentioned above, during the defrosting operation, the refrigeration cycle device 10 can defrost the exterior heat exchanger 16 by heating the exterior heat exchanger 16 using the heat stored in the heat storage member 17 as a heat source.

In the defrosting operation, the refrigeration cycle device 10 reduces the refrigerant discharging capability of the compressor 11, compared to that in the normal operation, and heats the exterior heat exchanger 16 using the heat stored in the heat storage member 17 as the heat source, thereby making it possible to defrost the exterior heat exchanger 16, while suppressing an increase in energy consumption of the compressor 11.

In addition, in the refrigeration cycle device 10 of the present embodiment, a solid containing the strongly correlated electron-based material is used as the heat storage member 17, and thereby the heat storage member 17 can store or dissipate heat required for the defrosting while being in the solid state through the phase change between the metal and the insulator. Thus, the heat storage member 17 can be very easily installed in the refrigerant pipe of the refrigeration cycle device 10, compared to the case of using heat storage agents to store or dissipate heat through the phase change between the liquid and solid or through the phase change between the gas and solid.

Specifically, the heat storage member 17 is disposed in the refrigerant pipe leading from the discharge port side of the compressor 11 to the inlet side of the expansion valve 15 in the normal operation, thus making it possible to very easily store the heat of the high-pressure refrigerant in the heat storage member 17.

The refrigeration cycle device 10 of the present embodiment uses the strongly correlated electron-based material formed by adding W to $VO_2$ as the transition metal oxide to adjust its transition temperature within a range of approximately 20° C. to 40° C. Therefore, the strongly correlated electron-based material can undergo the phase transition depending on the temperature of the refrigerant circulating through the refrigerant pipe that leads from the expansion valve 15 to the four-way valve 14, thereby achieving the effective heat storage or dissipation.

Second Embodiment

Figure 5:
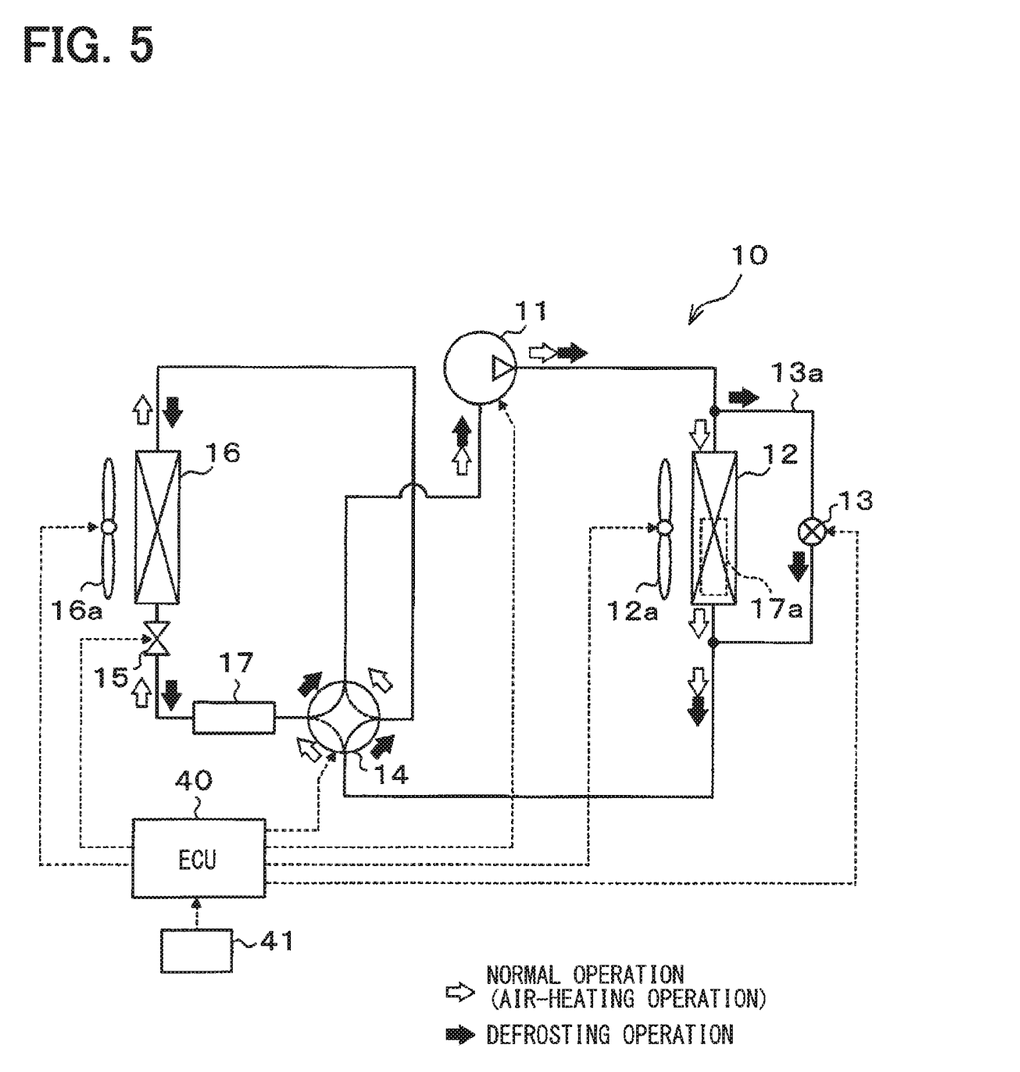
FIG. 5 is an entire configuration diagram of a refrigeration cycle device according to a second embodiment.

The present embodiment will describe an example in which a heating heat storage member 17a is added with respect to the configuration of the first embodiment, as shown in the entire configuration diagram of FIG. 5. In FIG. 5, the same or equivalent parts as those of the first embodiment are denoted by the same reference characters. The same goes for the following drawings.

The heating heat storage member 17a has substantially the same basic structure as the heat storage member 17 described in the first embodiment. The heating heat storage member 17a is disposed to store heat contained in the refrigerant that circulates through the interior radiator 12 during the normal operation.

More specifically, the heating heat storage member 17a is formed in the same manner as the heat storage member 17 of the first embodiment, and is disposed in the refrigerant flow passage of the interior radiator 12 without being accommodated in a dedicated container or the like so as to enable heat transfer through direct contact with the refrigerant circulating through the interior radiator 12. The present embodiment employs the heating heat storage member 17a in which an additive is added to a transition metal oxide to adjust its transition temperature within a range of approximately 40° C. to 60° C.

The refrigeration cycle device 10 of the present embodiment also operates the blower 12a in the defrosting operation in the same manner as in the normal operation. Other structures and operations of the refrigeration cycle device 10 are the same as those in the first embodiment.

Thus, the refrigeration cycle device 10 of the present embodiment can also defrost the exterior heat exchanger 16, while suppressing an increase in energy consumption by the compressor 11, as with the first embodiment. In addition, the refrigeration cycle device 10 of the present embodiment can heat the ventilation air to be blown from the blower 12a into the interior space by using heat stored in the heating heat storage member 17a as the heat source during the defrosting operation. Therefore, even during the defrosting operation, the air-heating of the interior space can be performed.

Third Embodiment

Figure 6:
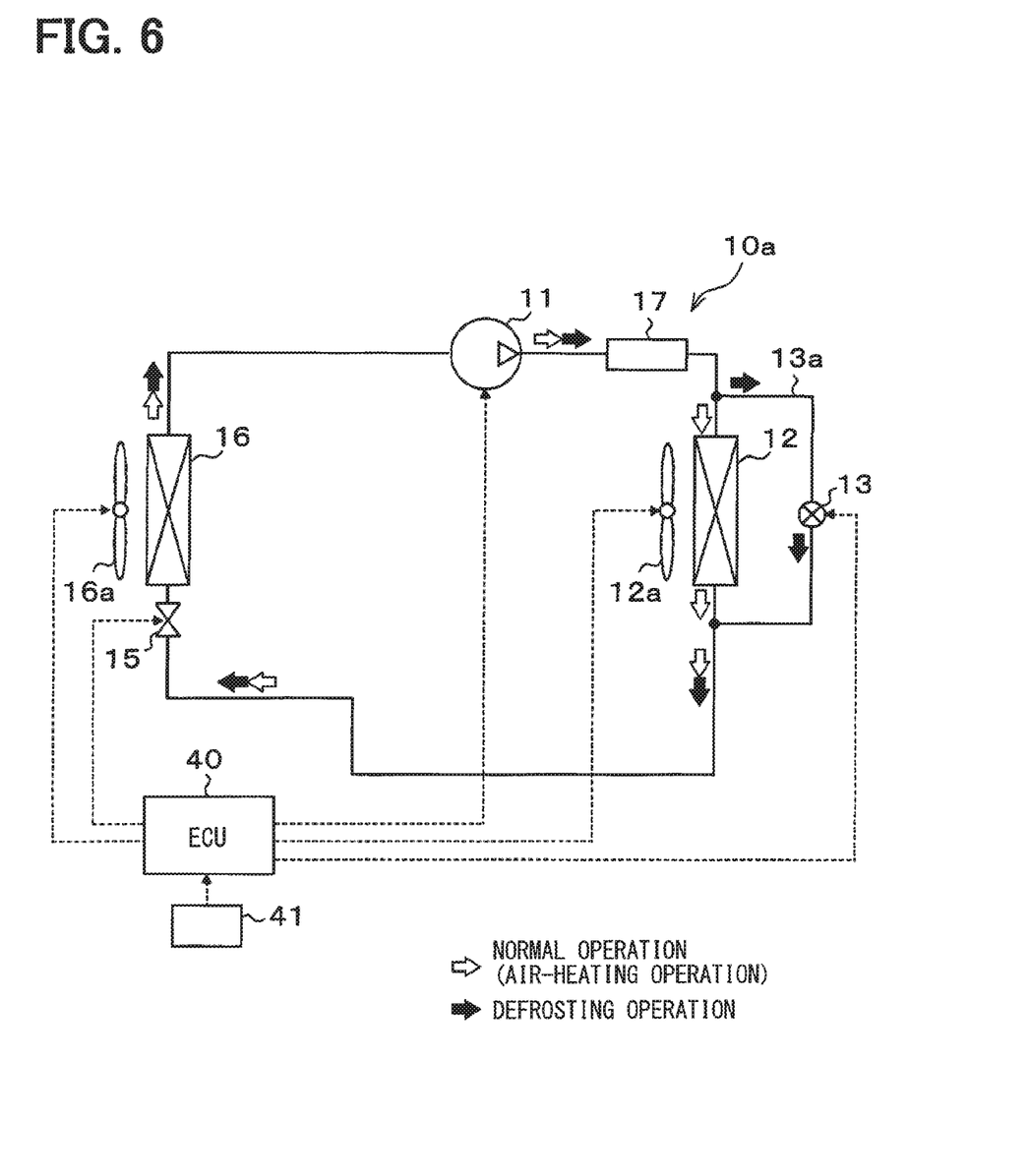
FIG. 6 is an entire configuration diagram of a refrigeration cycle device according to a third embodiment.

As shown in the entire configuration diagram of FIG. 6, the present embodiment will describe a refrigeration cycle device 10a in which the arrangement of the heat storage member 17 is changed and the four-way valve 14 is eliminated, with respect to the refrigeration cycle device 10 of the first embodiment.

The heat storage member 17 of the present embodiment is disposed in a refrigerant flow passage connecting the refrigerant discharge port of the compressor 11 and the refrigerant inlet of the interior radiator 12 without being accommodated in a dedicated container or the like to enable heat transfer through direct contact with the refrigerant. Thus, the heat storage member 17 is disposed in the refrigerant flow passage through which the refrigerant circulates in a range from the discharge port side of the compressor 11 to the inlet side of the expansion valve 15 during the normal operation. The present embodiment employs the heat storage member 17 in which an additive is added to a transition metal oxide to adjust its transition temperature within a range of approximately 60° C. to 80° C.

In the present embodiment, the inlet side of the expansion valve 15 is connected to the refrigerant inlet of the interior radiator 12, while the suction port side of the compressor 11 is connected to the refrigerant outlet of the exterior heat exchanger 16. Other structures and operations of the refrigeration cycle device in the present embodiment are the same as those in the first embodiment.

Thus, during the normal operation, the refrigeration cycle device is switched to a refrigerant circuit through which the refrigerant flows as indicated by the outlined arrows shown in FIG. 6. That is, the refrigeration cycle is configured to cause the refrigerant to circulate from the compressor 11 to the heat storage member 17, the interior radiator 12, the expansion valve 15, the exterior heat exchanger 16, and eventually the compressor 11 in this order. In the refrigeration cycle device 10a during the normal operation, the state of the refrigerant changes as shown in the Mollie diagram of FIG. 7.

Figure 7:
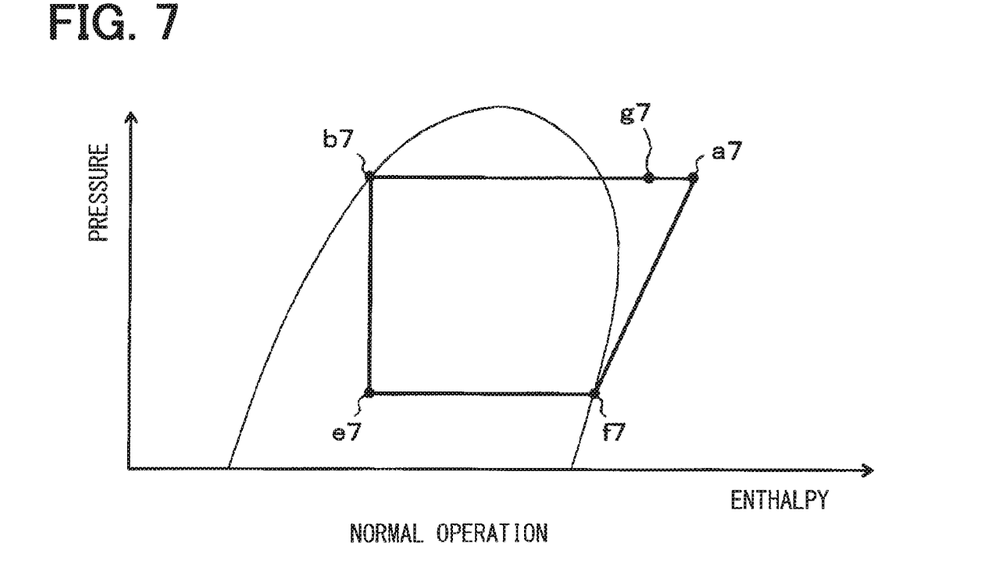
FIG. 7 is a Mollie diagram showing the state of a refrigerant in the normal operation of the refrigeration cycle device in the third embodiment.

More specifically, the high-temperature and high-pressure refrigerant discharged from the compressor 11 (at point a7 in FIG. 7) dissipates heat in the heat storage member 17 until the temperature of the heat storage member 17 becomes substantially equal to the temperature of the high-temperature and high-pressure refrigerant when the refrigerant circulates through a refrigerant pipe leading from the discharge port of the compressor 11 to the refrigerant inflow port of the interior radiator 12 (from point a7 to point g7 in FIG. 7). At this time, the heat storage member 17 stores heat contained in the high-temperature and high-pressure refrigerant through the phase transition of the strongly correlated electron-based material from the insulator to the metal.

The refrigerant flowing into the interior radiator 12 exchanges heat with the ventilation air blown from the blower 12a to dissipate heat in the interior radiator 12 (from point g7 to point b7 in FIG. 7). In this way, the ventilation air is heated. The high-pressure refrigerant flowing out of the interior radiator 12 flows into and is decompressed by the expansion valve 15 (from point b7 to point e7 in FIG. 7). The low-pressure refrigerant decompressed by the expansion valve 15 flows into the exterior heat exchanger 16.

The low-pressure refrigerant flowing into the exterior heat exchanger 16 absorbs heat from the outside air blown from the blower fan 16a to evaporate (from point e7 to point f7 in FIG. 7). The low-pressure refrigerant flowing out of the exterior heat exchanger 16 is drawn into and compressed again by the compressor 11 (from point f7 to point a7 in FIG. 7). As mentioned above, during the normal operation, the refrigeration cycle device 10a can perform air-heating of the interior space by heating the ventilation air in the interior radiator 12. In addition, the heat storage member 17 can store heat therein.

On the other hand, during the defrosting operation, the refrigeration cycle device is switched to a refrigerant circuit through which the refrigerant flows as indicated by the filled arrows shown in FIG. 6. That is, the refrigeration cycle is configured to cause the refrigerant to circulate from the compressor 11 to the heat storage member 17, (the bypass passage 13a), the expansion valve 15, the exterior heat exchanger 16, and eventually the compressor 11 in this order. In the refrigeration cycle device 10a during the defrosting operation, the state of the refrigerant changes as shown in the Mollie diagram of FIG. 8.

Figure 8:
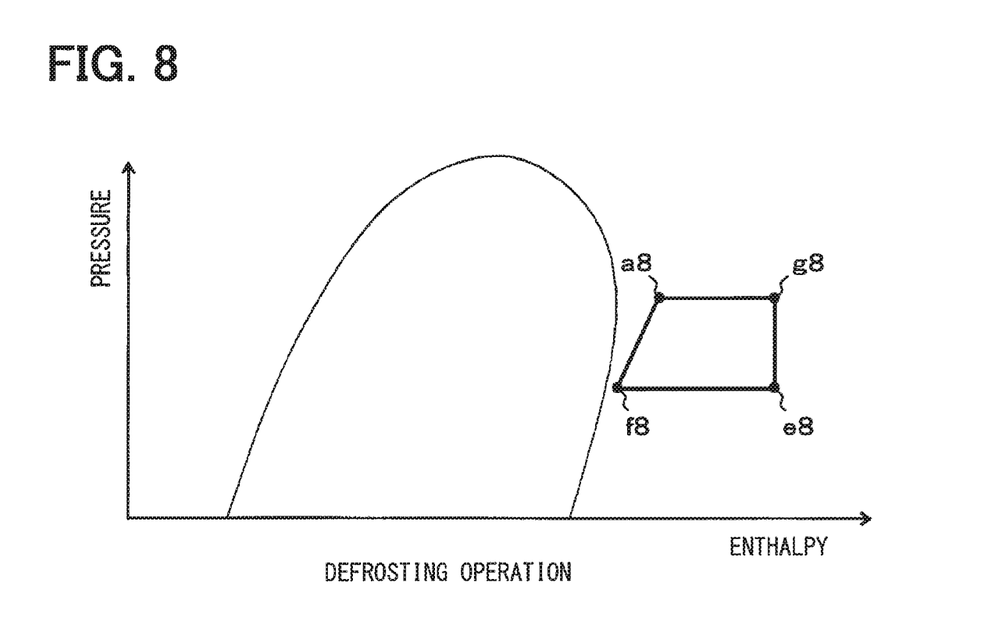
FIG. 8 is a Mollie diagram showing the state of the refrigerant in the defrosting operation of the refrigeration cycle device in the third embodiment.

More specifically, the refrigerant discharged from the compressor 11 (at point a8 in FIG. 8) absorbs heat stored in the heat storage member 17 until the temperature of the heat storage member 17 becomes substantially equal to the temperature of the refrigerant when the refrigerant circulates through a refrigerant pipe leading from the discharge port of the compressor 11 to the refrigerant inflow port of the interior radiator 12 (from point a8 to point g8 in FIG. 8). At this time, the heat storage member 17 dissipates heat stored therein through the phase transition of the strongly correlated electron-based material from the metal to the insulator.

The refrigerant having absorbed heat from the heat storage member 17 flows into and decompressed by the expansion valve 15 via the bypass passage 13a (from point g8 to point e8 in FIG. 8). The refrigerant decompressed by the expansion valve 15 flows into the exterior heat exchanger 16. The refrigerant flowing into the exterior heat exchanger 16 dissipates heat in the exterior heat exchanger 16 to melt the frost (from point e8 to point f8 in FIG. 8). In this way, the exterior heat exchanger 16 is defrosted.

The refrigerant flowing out of the exterior heat exchanger 16 is drawn into and pressurized again by the compressor 11 (from point f8 to point a8 in FIG. 8). As mentioned above, during the defrosting operation, the refrigeration cycle device 10a can defrost the exterior heat exchanger 16 by heating the exterior heat exchanger 16 using heat stored in the heat storage member 17 as the heat source.

Therefore, even when the heat storage member 17 is disposed, the present embodiment can heat the exterior heat exchanger 16 using the heat stored in the heat storage member 17 as the heat source, in the same manner as in the first embodiment. Consequently, the exterior heat exchanger 16 can be defrosted while suppressing an increase in energy consumption in the compressor 11.

Fourth Embodiment

Figure 9:
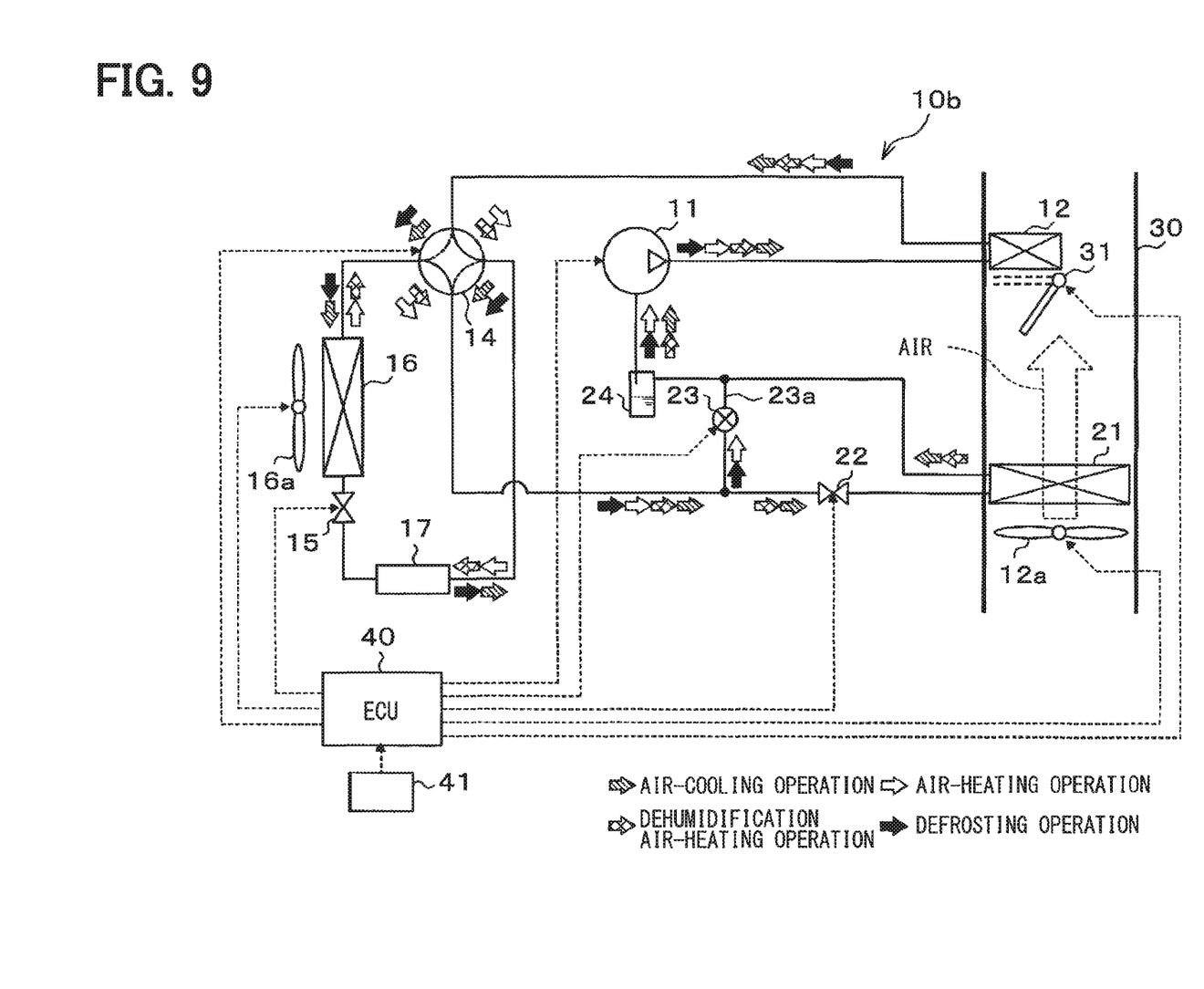
FIG. 9 is an entire configuration diagram of a refrigeration cycle device according to a fourth embodiment.

The present embodiment will describe an example in which a refrigeration cycle device 10b shown in the entire configuration diagram of FIG. 9 is used in a vehicle air conditioner. The refrigeration cycle device 10b serves to cool or heat the ventilation air to be blown into the vehicle interior, which is a space to be air-conditioned, in the vehicle air conditioner. Therefore, the ventilation air becomes a fluid to be heated in the refrigeration cycle device 10b.

By switching the refrigerant circuit, the refrigeration cycle device 10b can switch among an air-cooling operation for cooling the ventilation air, a dehumidification air-heating operation for reheating the cooled and dehumidified ventilation air, an air-heating operation for heating the ventilation air (corresponding to the normal operation of the first embodiment), and the defrosting operation for defrosting the exterior heat exchanger 16. Referring to FIG. 9, the refrigerant flow during the air-cooling operation is indicated by the arrows hatched with diagonal lines; the refrigerant flow during the dehumidification air-heating operation is indicated by the arrows hatched with shading; the refrigerant flow during the air-heating operation is indicated by the outlined arrows; and the refrigerant flow during the defrosting operation is indicated by the filled arrows.

In the refrigeration cycle device 10b, an interior evaporator 21, an air-cooling expansion valve 22, an air-heating bypass passage 23a, an air-heating on-off valve 23, and an accumulator 24 are added, and the bypass passage 13a and the on-off valve 13 are eliminated, compared to the refrigeration cycle device 10 described in the first embodiment.

The interior evaporator 21 is disposed in a refrigerant flow passage that connects the four-way valve 14 and the suction port side of the compressor 11. The interior evaporator 21 is a cooling heat exchanger that evaporates the low-pressure refrigerant decompressed by the air-cooling expansion valve 22 by exchanging heat with the ventilation air blown from the blower 12a to cool the ventilation air during the dehumidification air-heating operation and the air-cooling operation.

The air-cooling expansion valve 22 has substantially the same basic structure as the expansion valve 15 described in the first embodiment. The air-cooling expansion valve 22 has a completely closing function of closing the refrigerant passage that leads from the four-way valve 14 to the refrigerant inlet of the interior evaporator 21 by completely closing its throttle passage. Thus, the air-cooling expansion valve 22 configures the refrigerant circuit switching device for switching the refrigerant circuit together with the four-way valve 14.

More specifically, in the dehumidification air-heating operation and the air-cooling operation, the air-cooling expansion valve 22 is brought into a throttled state to exert a refrigerant decompression function. In addition, during the air-heating operation and the defrosting operation, the refrigerant passage is in a completely closed state in which the refrigerant passage is closed.

The refrigeration cycle device 10b is provided with the air-heating bypass passage 23a that guides the refrigerant flowing out of the four-way valve 14 to the refrigerant outlet side of the interior evaporator 21 while causing the refrigerant to bypass the air-cooling expansion valve 22 and the interior evaporator 21. The air-heating on-off valve 23 for opening and closing the air-heating bypass passage 23a is disposed in the air-heating bypass passage 23a.

The air-heating on-off valve 23 has substantially the same basic structure as the on-off valve 13 described in the first embodiment. The air-heating on-off valve 23 configures the refrigerant circuit switching device, together with the four-way valve 14 and the air-cooling expansion valve 22. More specifically, the air-heating on-off valve 23 closes the air-heating bypass passage 23a during the dehumidification air-heating operation and the air-cooling operation, and opens the air-heating bypass passage 23a during the air-heating operation and the defrosting operation.

The accumulator 24 is a gas-liquid separator that separates the refrigerant flowing out of the interior evaporator 21 or the refrigerant flowing out of the air-heating bypass passage 23a into a gas-phase refrigerant and a liquid-phase refrigerant to store therein the excessive liquid-phase refrigerant within the cycle while causing the separated gas-phase refrigerant to flow out to the suction side of the compressor 11.

The blower 12a, the interior evaporator 21, and the interior radiator 12 of the present embodiment are disposed in an air-conditioning casing 30. The air-conditioning casing 30 defines therein an air passage through which the ventilation air circulates. The blower 12a is disposed on the most upstream side of the air flow of the air passage.

The interior evaporator 21 and the interior radiator 12 are disposed in this order on the downstream side of the blower 12a in the air passage. Thus, in the air-conditioning casing 30, the ventilation air having passed through the interior evaporator 21 can further flow into the interior radiator 12.

An air mix door 31 is disposed on the downstream side of the interior evaporator 21 and on the upstream side of the interior radiator 12 in the air passage. The air mix door 31 is an air volume ratio adjustment device that adjusts the air volume ratio of the volume of ventilation air flowing into the interior radiator 12 to the volume of ventilation air flowing downstream while bypassing the interior radiator 12, in the whole ventilation air passing through the interior evaporator 21.

The air mix door 31 is coupled to an electric actuator (servo motor) that drives and displaces the air mix door 31. The electric actuator has its operation controlled by a control signal output from the controller 40. Other structures of the present embodiment are the same as those in the first embodiment.

Next, the operation of the refrigeration cycle device 10b with the above-mentioned configuration in the present embodiment will be described. As mentioned above, the refrigeration cycle device 10b of the present embodiment can switch among the air-cooling operation, the dehumidification air-heating operation, the air-heating operation, and the defrosting operation. The switching among these operations is performed by executing an air-conditioning control program prestored in the controller 40. The air-conditioning control program starts to be executed when the operation switch on the operation panel 41 is turned on.

More specifically, a main routine of the air-conditioning control program involves reading the detection signals from the above-mentioned air-conditioning control sensor group and the operation signals from various operation switches. Then, a target air outlet temperature TAO, which is a target temperature of the air to be blown into the vehicle interior, is calculated based on values of the read detection signal and operation signal.

When an air-cooling switch on the operation panel 41 is turned on, and the target air outlet temperature TAO is lower than a predetermined reference air-cooling temperature KT, the air-cooling operation is executed. When the target air outlet temperature TAO is equal to or higher than the reference air-cooling temperature KT while the air-cooling switch is turned on, the dehumidification air-heating operation is executed. When the air-cooling switch is not turned on, the air-heating operation is executed.

Thus, the refrigeration cycle device 10b of the present embodiment executes the air-cooling operation mainly when the outside air temperature is relatively high, such as in summer. The refrigeration cycle device 10b executes the dehumidification air-heating operation mainly in early spring, early winter, or the like. The refrigeration cycle device 10b executes the air-heating operation mainly when the outside air temperature is relatively low, such as in winter. During the execution of the air-heating operation, the defrosting operation is executed when the frost formation determination portion determines that frost is formed on the exterior heat exchanger 16. Hereinafter, the respective operations will be described.

(1) Air-Cooling Operation

First, the air-cooling operation of the refrigeration cycle device will be described. During the air-cooling operation, the controller 40 fully opens the expansion valve 15, brings the air-cooling expansion valve 22 into a throttled state, and closes the air-heating on-off valve 23. Further, the controller 40 controls the operation of the four-way valve 14 to connect the refrigerant outlet side of the interior radiator 12 and the side of one refrigerant inflow/outflow port of the exterior heat exchanger 16 and simultaneously to connect the side of one inflow/outflow port of the expansion valve 15 and the suction port side of the compressor 11.

The controller 40 also controls an operation of the electric actuator for the air mix door 31 such that the ventilation air having passed through the interior evaporator 21 bypasses the interior radiator 12. Furthermore, the controller 40 controls the operations of the compressor 11, the blower 12a, the blower fan 16a, and the air-cooling expansion valve 22 in accordance with the detection signals from the air-conditioning control sensor group such that the temperature of the ventilation air to be blown into the vehicle interior approaches the target air outlet temperature TAO.

Specifically, the controller 40 of the present embodiment controls the operation of the compressor 11 such that a refrigerant evaporation temperature in the interior evaporator 21 is 3° C. or higher in the air-cooling operation and the dehumidification air-heating operation. Therefore, in the refrigeration cycle device 10b of the present embodiment, frost may not be formed on the interior evaporator 21, and hence the interior evaporator 21 does not need to be defrosted.

Thus, during the air-cooling operation, the refrigeration cycle device is switched to a refrigerant circuit through which the refrigerant flows as indicated by the arrows hatched with diagonal lines shown in FIG. 9. That is, in the refrigerant circuit, to which the refrigeration cycle device is switched, the refrigerant circulates from the compressor 11 to (the interior radiator 12, the four-way valve 14), the exterior heat exchanger 16, (the expansion valve 15), the heat storage member 17, (the four-way valve 14), the air-cooling expansion valve 22, the interior evaporator 21, the accumulator 24, and eventually the compressor 11 in this order.

Therefore, during the air-cooling operation, the high-temperature and high-pressure refrigerant discharged from the compressor 11 flows into the exterior heat exchanger 16 via the interior radiator 12 and the four-way valve 14. At this time, the ventilation air blown from the blower 12a and having passed through the interior evaporator 21 flows bypassing the interior radiator 12 by the air mix door 31. Consequently, the refrigerant having passed through the interior radiator 12 is prevented from dissipating heat into the ventilation air.

The high-temperature and high-pressure refrigerant flowing into the exterior heat exchanger 16 exchanges heat with the outside air blown from the blower fan 16a to dissipate heat therefrom. The high-pressure refrigerant flowing out of the exterior heat exchanger 16 flows into the air-cooling expansion valve 22 via the four-way valve 14 without being decompressed because the expansion valve 15 is fully opened. Then, the high-pressure refrigerant dissipates heat in the heat storage member 17 until the temperature of the heat storage member 17 becomes substantially equal to the temperature of the high-pressure refrigerant when circulating through a refrigerant pipe leading from the expansion valve 15 to the four-way valve 14.

The refrigerant flowing into the throttled air-cooling expansion valve 22 is decompressed to a low-pressure refrigerant. The low-pressure refrigerant decompressed by the air-cooling expansion valve 22 flows into the interior evaporator 21. The refrigerant flowing into the interior evaporator 21 evaporates therein by absorbing heat from the ventilation air blown from the blower 12a. In this way, the ventilation air is cooled.

The low-pressure refrigerant flowing out of the interior evaporator 21 flows into the accumulator 24 to be separated into a gas-phase refrigerant and a liquid-phase refrigerant. The gas-phase refrigerant separated by the accumulator 24 is drawn into and compressed again by the compressor 11. As mentioned above, during the air-cooling operation, the refrigeration cycle device 10b can perform air-cooling of the vehicle interior by cooling the ventilation air in the interior evaporator 21 and then blowing the cooled ventilation air into the vehicle interior.

(2) Dehumidification Air-Heating Operation

Next, the dehumidification air-heating operation of the refrigeration cycle device will be described. During the dehumidification air-heating operation, the controller 40 brings the expansion valve 15 and the air-cooling expansion valve 22 into a throttled state, and closes the air-heating on-off valve 23. Further, the controller 40 controls the operation of the four-way valve 14 to connect the refrigerant outlet side of the interior radiator 12 and the side of one inflow/outflow port of the expansion valve 15 and simultaneously to connect the side of one refrigerant inflow/outflow port of the exterior heat exchanger 16 and the suction port side of the compressor 11.

The controller 40 also controls the operation of the electric actuator for the air mix door 31 such that the ventilation air having passed through the interior evaporator 21 passes through the interior radiator 12. Furthermore, the controller 40 controls the operations of the compressor 11, the blower 12a, the blower fan 16a, the expansion valve 15, and the air-cooling expansion valve 22 in accordance with the detection signals from the air-conditioning control sensor group such that the temperature of the ventilation air to be blown into the vehicle interior approaches the target air outlet temperature TAO.

Thus, during the dehumidification air-heating operation, the refrigeration cycle device is switched to a refrigerant circuit through which the refrigerant flows as indicated by the arrows hatched with shading shown in FIG. 9. That is, in the refrigerant circuit, to which the refrigeration cycle device is switched, the refrigerant circulates from the compressor 11 to the interior radiator 12, (the four-way valve 14), the heat storage member 17, the expansion valve 15, the exterior heat exchanger 16, (the four-way valve 14), the air-cooling expansion valve 22, the interior evaporator 21, the accumulator 24, and eventually the compressor 11 in this order.

In the dehumidification air-heating operation, the high-temperature and high-pressure refrigerant discharged from the compressor 11 flows into the interior radiator 12. During the dehumidification air-heating operation, the air mix door 31 is displaced such that the ventilation air (cold air) having passed through the interior evaporator 21 passes through the interior radiator 12. Thus, the refrigerant passing through the interior radiator 12 dissipates heat into the ventilation air having passed through the interior evaporator 21. In this way, the ventilation air having passed through the interior evaporator 21 is heated.

The high-pressure refrigerant flowing out of the interior radiator 12 then flows into the expansion valve 15 via the four-way valve 14. The high-pressure refrigerant dissipates heat in the heat storage member 17 until the temperature of the heat storage member 17 becomes substantially equal to the temperature of the high-pressure refrigerant when circulating through a refrigerant pipe leading from the four-way valve 14 to the expansion valve 15.

The refrigerant decompressed by the expansion valve 15 flows into the exterior heat exchanger 16. At this time, when the temperature of the refrigerant decompressed by the expansion valve 15 is higher than the outside air temperature, the refrigerant flowing into the exterior heat exchanger 16 dissipates heat into the outside air blown from the blower fan 16a. On the other hand, when the temperature of the refrigerant decompressed by the expansion valve 15 is lower than the outside air temperature, the refrigerant flowing into the exterior heat exchanger 16 absorbs heat from the outside air blown from the blower fan 16a.

In the dehumidification air-heating operation of the present embodiment, a throttle opening degree of the expansion valve 15 is reduced, and a throttle opening degree of the air-cooling expansion valve 22 is enlarged with increasing heating capability required to heat the ventilation air. Thus, when the heating capability becomes relatively small, the exterior heat exchanger 16 functions as a refrigerant heat-dissipation heat exchanger, whereas when the heating capability becomes relatively large, the exterior heat exchanger 16 functions as a refrigerant evaporation heat exchanger.

The refrigerant flowing out of the exterior heat exchanger 16 flows into the air-cooling expansion valve 22 via the four-way valve 14. The refrigerant flowing into the air-cooling expansion valve 22 is decompressed to a low-pressure refrigerant. The low-pressure refrigerant decompressed by the air-cooling expansion valve 22 flows into the interior evaporator 21. The refrigerant flowing into the interior evaporator 21 evaporates therein by absorbing heat from the ventilation air blown from the blower 12a. In this way, the ventilation air is cooled. The subsequent operation is the same as in the air-cooling operation.

As mentioned above, during the dehumidification air-heating operation, the refrigeration cycle device 10b cools and dehumidifies the ventilation air in the interior evaporator 21, and then reheats the dehumidified ventilation air in the interior radiator 12. The reheated ventilation air is blown into the vehicle interior, thereby making it possible to perform the dehumidification air-heating of the vehicle interior.

(3) Air-Heating Operation

Next, the air-heating operation of the refrigeration cycle device will be described. During the air-heating operation, the controller 40 brings the expansion valve 15 into a throttled state, completely closes the air-cooling expansion valve 22, and opens the air-heating on-off valve 23. Further, the controller 40 controls the operation of the four-way valve 14 to connect the refrigerant outlet side of the interior radiator 12 and the side of one inflow/outflow port of the expansion valve 15 and simultaneously to connect the side of one refrigerant inflow/outflow port of the exterior heat exchanger 16 and the suction port side of the compressor 11.

The controller 40 also controls the operation of the electric actuator for the air mix door 31 such that the ventilation air having passed through the interior evaporator 21 passes through the interior radiator 12. Furthermore, the controller 40 controls the operations of the compressor 11, the blower 12a, the blower fan 16a, and the expansion valve 15 in accordance with the detection signals from the air-conditioning control sensor group such that the temperature of the ventilation air to be blown into the vehicle interior approaches the target air outlet temperature TAO.

Thus, during the air-heating operation, the refrigeration cycle device is switched to a refrigerant circuit through which the refrigerant flows as indicated by the outlined arrows shown in FIG. 9. That is, in the refrigerant circuit, to which the refrigeration cycle device is switched, the refrigerant circulates from the compressor 11 to the interior radiator 12, (the four-way valve 14), the heat storage member 17, the expansion valve 15, the exterior heat exchanger 16, (the four-way valve 14, the air-heating bypass passage 23a), the accumulator 24, and eventually the compressor 11 in this order.

Therefore, the refrigeration cycle substantially equivalent to the above-mentioned refrigeration cycle device 10 during the normal operation in the first embodiment can be configured in the air-heating operation. Consequently, during the air-heating operation, as with the first embodiment, the air-heating of the interior space can be performed by heating the ventilation air in the interior radiator 12 and then blowing the heated ventilation air into the interior space. In addition, the heat storage member 17 can store heat therein.

(4) Defrosting Operation

Next, the defrosting operation of the refrigeration cycle device will be described. During the defrosting operation, the controller 40 brings the expansion valve 15 into a throttled state, completely closes the air-cooling expansion valve 22, and opens the air-heating on-off valve 23. Further, the controller 40 controls the operation of the four-way valve 14 to connect the refrigerant outlet side of the interior radiator 12 and the side of one refrigerant inflow/outflow port of the exterior heat exchanger 16 and simultaneously to connect the side of one inflow/outflow port of the expansion valve 15 and the suction port side of the compressor 11.

The controller 40 also controls an operation of the electric actuator for the air mix door 31 such that the ventilation air having passed through the interior evaporator 21 bypasses the interior radiator 12. Furthermore, the controller 40 reduces the refrigerant discharging capability of the compressor 11, compared to the air-heating operation, stops the operation of the blower 12a, and increases the throttle opening degree of the expansion valve 15, compared to the air-heating operation.

Thus, during the defrosting operation, the refrigeration cycle device is switched to a refrigerant circuit through which the refrigerant flows as indicated by the filled arrows shown in FIG. 9. That is, in the refrigerant circuit, to which the refrigeration cycle device is switched, the refrigerant circulates from the compressor 11 to (the interior radiator 12, the four-way valve 14), the exterior heat exchanger 16, the expansion valve 15, the heat storage member 17, (the four-way valve 14, the air-heating bypass passage 23a), the accumulator 24, and eventually the compressor 11 in this order.

During the defrosting operation, the blower 12a is stopped, and the air mix door 31 is displaced such that the ventilation air (cold air) having passed through the interior evaporator 21 bypasses the interior radiator 12, thereby preventing the refrigerant passing through the interior radiator 12 from dissipating heat into the ventilation air. Therefore, the refrigeration cycle substantially equivalent to the above-mentioned refrigeration cycle device 10 during the defrosting operation in the first embodiment can be configured in the defrosting operation.

Consequently, during the defrosting operation, the frost formed on the exterior heat exchanger 16 can be melted and removed from the exterior heat exchanger 16 in the same manner as in the first embodiment. That is, according to the refrigeration cycle device 10b of the present embodiment, the defrosting of the exterior heat exchanger 16 can be performed while suppressing an increase in the energy consumption of the compressor 11, as with the first embodiment.

Fifth Embodiment

Figure 10:
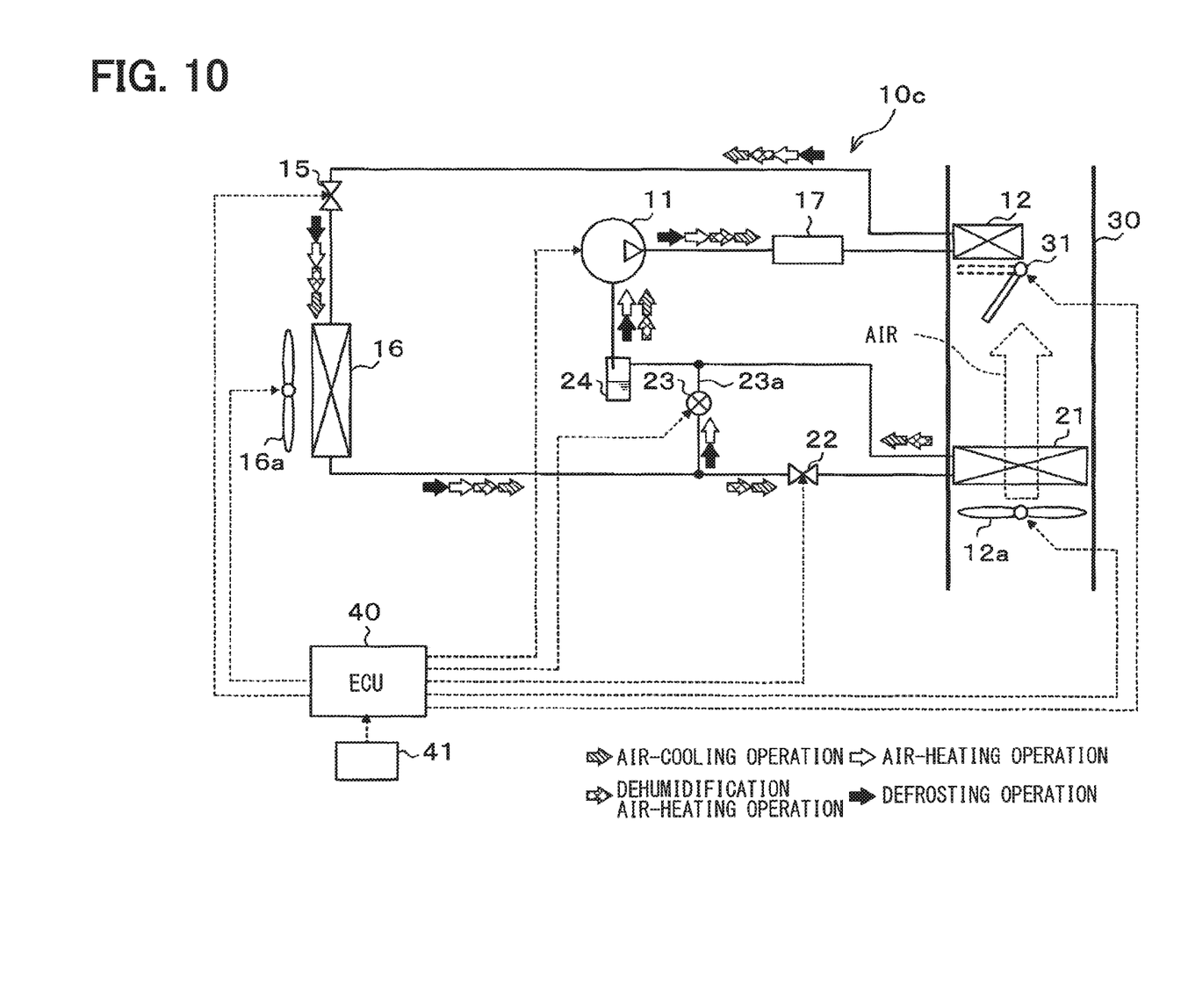
FIG. 10 is an entire configuration diagram of a refrigeration cycle device according to a fifth embodiment.

The present embodiment will describe an example in which a refrigeration cycle device 10c shown in the entire configuration diagram of FIG. 10 is used in a vehicle air conditioner, like the fourth embodiment.

By switching the refrigerant circuit in the same manner as in the fourth embodiment, the refrigeration cycle device 10c of the present embodiment can also switch among the air-cooling operation for cooling the ventilation air, the dehumidification air-heating operation for reheating the cooled and dehumidified ventilation air, the air-heating operation for heating the ventilation air, and the defrosting operation for defrosting the exterior heat exchanger 16.

In the refrigeration cycle device 10c, the interior evaporator 21, the air-cooling expansion valve 22, the air-heating bypass passage 23a, the air-heating on-off valve 23, and the accumulator 24 are added, and the bypass passage 13a and the on-off valve 13 are eliminated, like the fourth embodiment, compared to the refrigeration cycle device 10a described in the third embodiment. Other structures of the present embodiment are the same as those in the third embodiment.

Next, the operation of the refrigeration cycle device 10c with the above-mentioned configuration in the present embodiment will be described. As with the refrigeration cycle device 10b described in the fourth embodiment, the refrigeration cycle device 10c can switch among the air-cooling operation, the dehumidification air-heating operation, the air-heating operation, and the defrosting operation. Hereinafter, the respective operations will be described.

(1) Air-Cooling Operation

First, the air-cooling operation of the refrigeration cycle device will be described. During the air-cooling operation, the controller 40 fully opens the expansion valve 15, brings the air-cooling expansion valve 22 into a throttled state, and closes the air-heating on-off valve 23.

The controller 40 controls an operation of the electric actuator for the air mix door 31 such that the ventilation air having passed through the interior evaporator 21 bypasses the interior radiator 12. The controller 40 also controls the operations of the compressor 11, the blower 12a, the blower fan 16a, and the air-cooling expansion valve 22 in accordance with the detection signals from the air-conditioning control sensor group such that the temperature of the ventilation air to be blown into the vehicle interior approaches the target air outlet temperature TAO.

Thus, during the air-cooling operation, the refrigeration cycle device is switched to a refrigerant circuit through which the refrigerant flows as indicated by the arrows hatched with diagonal lines shown in FIG. 10. That is, in the refrigerant circuit, to which the refrigeration cycle device is switched, the refrigerant circulates from the compressor 11 to the heat storage member 17, (the interior radiator 12, the expansion valve 15), the exterior heat exchanger 16, the air-cooling expansion valve 22, the interior evaporator 21, the accumulator 24, and eventually the compressor 11 in this order.

Thus, the refrigeration cycle substantially equivalent to the above-mentioned refrigeration cycle device 10b during the air-cooling operation in the fourth embodiment can be configured in the air-cooling operation. Consequently, during the air-cooling operation, as with the fourth embodiment, the air-cooling of the vehicle interior can be performed by cooling the ventilation air in the interior evaporator 21 and then blowing the cooled ventilation air into the vehicle interior.

(2) Dehumidification Air-Heating Operation

Next, the dehumidification air-heating operation of the refrigeration cycle device will be described. During the dehumidification air-heating operation, the controller 40 brings the expansion valve 15 and the air-cooling expansion valve 22 into a throttled state, and closes the air-heating on-off valve 23.

The controller 40 controls the operation of the electric actuator for the air mix door 31 such that the ventilation air having passed through the interior evaporator 21 passes through the interior radiator 12. Further, the controller 40 controls the operations of the compressor 11, the blower 12a, the blower fan 16a, the expansion valve 15, and the air-cooling expansion valve 22 in accordance with the detection signals from the air-conditioning control sensor group such that the temperature of the ventilation air to be blown into the vehicle interior approaches the target air outlet temperature TAO.

Thus, during the dehumidification air-heating operation, the refrigeration cycle device is switched to a refrigerant circuit through which the refrigerant flows as indicated by the arrows hatched with shading shown in FIG. 10. That is, in the refrigerant circuit, to which the refrigeration cycle device is switched, the refrigerant circulates from the compressor 11 to the heat storage member 17, the interior radiator 12, the expansion valve 15, the exterior heat exchanger 16, the air-cooling expansion valve 22, the interior evaporator 21, the accumulator 24, and eventually the compressor 11 in this order.

Thus, the refrigeration cycle substantially equivalent to the above-mentioned refrigeration cycle device 10b during the dehumidification air-heating operation in the fourth embodiment can be configured in the dehumidification air-heating operation. Consequently, during the dehumidification air-heating operation, like the fourth embodiment, the refrigeration cycle device 10c cools and dehumidifies the ventilation air in the interior evaporator 21, and then reheats the dehumidified ventilation air in the interior radiator 12. The reheated ventilation air is blown into the vehicle interior, thereby making it possible to perform the dehumidification air-heating of the vehicle interior.

(3) Air-Heating Operation

Next, the air-heating operation of the refrigeration cycle device will be described. During the air-heating operation, the controller 40 brings the expansion valve 15 into a throttled state, completely closes the air-cooling expansion valve 22, and opens the air-heating on-off valve 23.

The controller 40 controls the operation of the electric actuator for the air mix door 31 such that the ventilation air having passed through the interior evaporator 21 passes through the interior radiator 12. The controller 40 also controls the operations of the compressor 11, the blower 12a, the blower fan 16a, and the expansion valve 15 in accordance with the detection signals from the air-conditioning control sensor group such that the temperature of the ventilation air to be blown into the vehicle interior approaches the target air outlet temperature TAO.

Thus, during the air-heating operation, the refrigeration cycle device is switched to a refrigerant circuit through which the refrigerant flows as indicated by the outlined arrows shown in FIG. 10. That is, in the refrigerant circuit, to which the refrigeration cycle device is switched, the refrigerant circulates from the compressor 11 to the heat storage member 17, the interior radiator 12, the expansion valve 15, the exterior heat exchanger 16, (the air-heating bypass passage 23a), the accumulator 24, and eventually the compressor 11 in this order.

Thus, the refrigeration cycle substantially equivalent to the above-mentioned refrigeration cycle device 10a during the normal operation in the third embodiment, can be configured in the air-heating operation. Consequently, during the air-heating operation, as with the third embodiment, the air-heating of the interior space can be performed by heating the ventilation air in the interior radiator 12 and then blowing the heated ventilation air into the interior space. In addition, the heat storage member 17 can store heat therein.

(4) Defrosting Operation

Next, the defrosting operation of the refrigeration cycle device will be described. During the defrosting operation, the controller 40 brings the expansion valve 15 into a throttled state, completely closes the air-cooling expansion valve 22, and opens the air-heating on-off valve 23.

The controller 40 controls an operation of the electric actuator for the air mix door 31 such that the ventilation air having passed through the interior evaporator 21 bypasses the interior radiator 12. The controller 40 also reduces the refrigerant discharging capability of the compressor 11, compared to the air-heating operation, stops the operation of the blower 12a, and increases the throttle opening degree of the expansion valve 15, compared to the air-heating operation.

Thus, during the defrosting operation, the refrigeration cycle device is switched to a refrigerant circuit through which the refrigerant flows as indicated by the filled arrows shown in FIG. 10. That is, in the refrigerant circuit, to which the refrigeration cycle device is switched, the refrigerant circulates from the compressor 11 to the heat storage member 17, (the interior radiator 12), the expansion valve 15, the exterior heat exchanger 16, (the air-heating bypass passage 23a), the accumulator 24, and eventually the compressor 11 in this order.

During the defrosting operation, the blower 12a is stopped, and the air mix door 31 is displaced such that the ventilation air (cold air) having passed through the interior evaporator 21 bypasses the interior radiator 12, thereby preventing the refrigerant passing through the interior radiator 12 from dissipating heat into the ventilation air. Therefore, the refrigeration cycle substantially equivalent to the above-mentioned refrigeration cycle device 10a during the defrosting operation in the third embodiment can be configured in the defrosting operation.

Consequently, during the defrosting operation, the frost formed on the exterior heat exchanger 16 can be melted and removed from the exterior heat exchanger 16 in the same manner as in the third embodiment. That is, according to the refrigeration cycle device 10c of the present embodiment, the defrosting of the exterior heat exchanger 16 can be performed while suppressing an increase in the energy consumption of the compressor 11, like the third embodiment.

Other Embodiments

The present disclosure is not limited to the above-mentioned embodiments, and various modifications and changes can be made to those embodiments in the following way without departing from the scope and spirit of the present disclosure.

(1) Although in the above-mentioned embodiments, W (tungsten) is used by way of example as an additive for $VO_2$ (vanadium dioxide) as a transition metal oxide, it is apparent that only $VO_2$ may be used depending on the used temperature range of the refrigerant in the refrigeration cycle device.

A suitable additive for adjusting the transition temperature of the transition metal oxide is not limited to W. Examples of the additive suitable for use include at least one of Cr (chromium), Nb (niobium), Ti (titanium), Al (aluminum), Mn (manganese), Fe (iron), Co (cobalt), Ni (nickel), Cu (copper), Y (yttrium), Zr (zirconium), Mo (molybdenum), Ru (ruthenium), Rh (rhodium), Pd (palladium), Hf (hafnium), Ta (tantalum), and Re (rhenium)

(2) Although in the above-mentioned second embodiment, the heating heat storage member 17a is disposed in the refrigerant flow passage by way of example, the arrangement of the heating heat storage member 17a is not limited thereto. That is, any arrangement of the heating heat storage member 17a may be used as long as the heating heat storage member 17a can store therein the heat of the refrigerant circulating through the interior radiator 12.

For example, a so-called tank-tube heat exchanger is employed as the interior radiator 12. The tank-tube heat exchanger includes one tank for collecting or distributing the refrigerant, a plurality of tubes through which the refrigerant circulates, and the other tank connected to the plurality of tubes for collecting or distributing the refrigerant. The heating heat storage member 17a formed in a thin plate shape may be fixed to the tubes by an adhesive or the like.

In the refrigeration cycle device 10 of the second embodiment, even when the heat storage member 17 is eliminated, and the defrosting is intended to be performed using hot gas during the defrosting operation, the heating heat storage member 17a can heat the fluid to be heated (ventilation air).

(3) The respective components configuring the refrigeration cycle devices 10, 10a to 10c are not limited to those disclosed in the above-mentioned embodiments.

Although in the above-mentioned embodiments, the electric compressor is employed by way of example as the compressor 11, the compressor 11 is not limited thereto. For example, the compressor 11 suitable for use may be an engine-driven variable displacement compressor or a fixed displacement compressor. A so-called subcool condenser or the like may be employed as the interior radiator 12. The subcool condenser includes a condensing portion for condensing the high-temperature and high-pressure refrigerant and a subcooling portion for subcooling the refrigerant condensed in the condensing portion.

In the above-mentioned embodiment, a control program for comparing the detection value Te of the exterior unit temperature sensor with the detection value Tam of the outside-air temperature sensor is employed by way of example as the frost formation determination portion. However, the frost formation determination portion is not limited thereto. For example, the control program suitable for use may be one designed to determine that frost is formed on the exterior heat exchanger 16 when the detection value Te of the exterior unit temperature sensor becomes substantially equal to or lower than the predetermined reference frost-formation temperature KT1. In this case, the reference frost-formation temperature KT1 is desirably set at a value lower than 0° C.

Although the above-mentioned embodiments have not mentioned the refrigerant used in the refrigeration cycle devices 10 and 10a to 10c, any refrigerant used in general refrigeration cycles is found to be suitable without adversely affecting the heat storage performance of the heat storage members 17 and 17a. For this reason, examples of the refrigerant suitable for use include R1234yf, R134a, R600a, R410A, R404A, R32, R407C, HFO-1234ze, HFO-1234zd, and the like.

(4) Although in the above-mentioned embodiments, the refrigeration cycle devices 10 and 10a to 10c according to the present disclosure are applied to the air conditioner by way of example, the applications of the refrigeration cycle devices 10 and 10a to 10c are not limited thereto. That is, the refrigeration cycle device according to the present disclosure is applicable to any device that could have frost formed on an evaporator (exterior heat exchanger 16) during use. For example, the refrigeration cycle device of the present disclosure may be applied to a water heater that heats supplied water, which is a fluid to be heated, with a radiator using heat absorbed in an evaporator from the outside air as a heat source.

(5) Means disclosed in the above-mentioned respective embodiments may be combined together within the implementable range as appropriate. For example, the heating heat storage member 17a described in the second embodiment may be applied to the refrigeration cycle devices 10a to 10c described in the third to fifth embodiments.

What is claimed is:

1. A refrigeration cycle device comprising:
   a compressor that compresses and discharges a refrigerant;
   a radiator that dissipates heat from the refrigerant;
   a decompression device that decompresses the refrigerant;
   an evaporator that evaporates the refrigerant; and
   a heat storage member provided in a refrigerant flow passage through which the refrigerant circulates, the heat storage member being made of a strongly correlated electron-based solid material that stores or dissipates heat by undergoing a phase transition between a metal and an insulator, the heat storage member having a plurality of holes extending from an inlet side to an outlet side of the heat storage member, and the heat storage member being configured to store and dissipate heat by the strongly correlated electron-based material directly contacting the refrigerant circulating through the plurality of holes extending from the inlet side to the outlet side of the heat storage member, wherein
   during a normal operation, the heat storage member stores heat contained in high-pressure refrigerant that circulates through the refrigerant flow passage from a discharge side of the compressor, and
   during a defrosting operation, the heat storage member dissipates heat into the refrigerant that circulates through the refrigerant flow passage leading to the evaporator and to heat and remove frost formed on the evaporator.

2. The refrigeration cycle device according to claim 1, wherein
   the strongly correlated electron-based material is a transition metal oxide selected from the group consisting of vanadium dioxide and vanadium dioxide plus at least one additive selected from the group consisting of tungsten, chromium, niobium, titanium, aluminum, manganese, iron, cobalt, nickel, copper, yttrium, zirconium, molybdenum, ruthenium, rhodium, palladium, hafnium, tantalum, and rhenium.

3. The refrigeration cycle device according to claim 1, further comprising:
   a heating heat storage member configured to store heat contained in the refrigerant circulating through the radiator during the normal operation, wherein
   the radiator is configured to heat a fluid to be heated by dissipating heat of the refrigerant into the fluid to be heated during the normal operation, and
   the radiator is configured to heat the fluid to be heated by using the heat stored in the heating heat storage member as a heat source during the defrosting operation.

4. The refrigeration cycle device according to claim 1, further comprising:
   a switching device capable of switching between operation modes, including the normal operation and the defrosting operation; and
   a controller configured to control an operation of the switching device.

5. The refrigeration cycle device according to claim 1, wherein
   the strongly correlated electron-based material has a phase transition temperature range of 20 to 40° C.

6. The refrigeration cycle device according to claim 2, wherein
   the transition metal oxide has a transition temperature range of approximately 20 to 40° C.

* * * * *